(12) United States Patent
Shepherd et al.

(10) Patent No.: US 11,547,233 B2
(45) Date of Patent: Jan. 10, 2023

(54) QUICK LOADING CURTAIN TRACK FOR AN AIRCRAFT CABIN

(71) Applicant: The Boeing Company, Chicago, IL (US)

(72) Inventors: Rick E. Shepherd, Arlington, WA (US); Ian M. Piper, Seattle, WA (US); Robert B. Lanfear, Kingston, WA (US)

(73) Assignee: The Boeing Company, Chicago, IL (US)

(*) Notice: Subject to any disclaimer, the term of this patent is extended or adjusted under 35 U.S.C. 154(b) by 357 days.

(21) Appl. No.: 16/784,818

(22) Filed: Feb. 7, 2020

(65) Prior Publication Data
US 2021/0244223 A1   Aug. 12, 2021

(51) Int. Cl.
| | |
|---|---|
| *A47H 1/06* | (2006.01) |
| *A47H 15/04* | (2006.01) |
| *B64D 11/00* | (2006.01) |
| *A47H 13/04* | (2006.01) |
| *A47H 1/00* | (2006.01) |

(52) U.S. Cl.
CPC ............... *A47H 1/06* (2013.01); *A47H 13/04* (2013.01); *A47H 15/04* (2013.01); *B64D 11/0023* (2013.01); *A47H 2001/006* (2013.01)

(58) Field of Classification Search
CPC .......... A47H 1/06; A47H 13/04; A47H 15/04; A47H 2001/006; B64D 11/0023; Y10T 16/354; Y10T 16/376; Y10T 16/378; Y10T 16/35; Y10T 16/372; Y10T 16/3797; Y10S 160/05
See application file for complete search history.

(56) References Cited

U.S. PATENT DOCUMENTS

| | | | | |
|---|---|---|---|---|
| 1,735,314 | A * | 11/1929 | Duthie ..................... | E04F 10/02 160/DIG. 5 |
| 2,317,531 | A * | 4/1943 | Leslie ..................... | A47H 15/02 206/326 |
| 3,231,007 | A * | 1/1966 | Kerr ....................... | E06B 9/0623 160/332 |
| 3,262,148 | A * | 7/1966 | Saltz ...................... | A47H 15/02 D8/367 |
| 3,881,219 | A * | 5/1975 | Haarer ..................... | A47H 1/04 16/96 D |
| 4,153,969 | A * | 5/1979 | Mergenthaler ......... | A47H 13/00 16/95 D |
| 4,178,656 | A * | 12/1979 | MacFarlane ........... | A47H 15/04 16/95 D |

(Continued)

*Primary Examiner* — Victor D Batson
*Assistant Examiner* — Matthew J Sullivan
(74) *Attorney, Agent, or Firm* — Quinn IP Law (57) ABSTRACT

A curtain track for an aircraft cabin enables curtain sliders to be quickly loaded into the curtain track. The curtain track is constructed of an elongate channel with a first end fitting on a first end of the channel and a second end fitting on a second end of the channel. There is a unique cutout in the bottom surface of the first end fitting that forms a curved slot surface that enables curtain sliders to be loaded into the channel of the curtain track through the cutout to quickly load the curtain onto the curtain track without disassembling any of the parts of the curtain track or removing the curtain track from its attachment to the aircraft cabin.

20 Claims, 5 Drawing Sheets

(56) References Cited

U.S. PATENT DOCUMENTS

| | | | | |
|---|---|---|---|---|
| 4,299,008 | A * | 11/1981 | Burns | A47H 15/04 16/95 D |
| 4,520,608 | A * | 6/1985 | Baus | E06B 1/34 16/95 D |
| 4,694,531 | A * | 9/1987 | Foy | A47H 1/144 104/111 |
| 4,868,694 | A * | 9/1989 | Hagen | G11B 5/4826 |
| 5,421,059 | A * | 6/1995 | Leffers, Jr. | A47H 15/04 362/253 |
| 5,489,172 | A * | 2/1996 | Michler | B64D 11/0696 410/104 |
| 5,513,419 | A * | 5/1996 | Zinger | A47K 3/38 16/87.4 R |
| 5,520,235 | A * | 5/1996 | Coleman | E06B 9/323 248/261 |
| 6,050,322 | A * | 4/2000 | Finkelstein | A47H 13/00 160/184 |
| 6,439,293 | B1 * | 8/2002 | Kirkpatrick | B60H 1/00592 296/24.41 |
| 6,520,090 | B2 * | 2/2003 | Hudson | B61K 7/16 104/95 |
| 6,925,681 | B2 * | 8/2005 | Lin | B60J 1/2011 16/87 R |
| 8,408,275 | B2 * | 4/2013 | DeWees | A47H 1/08 160/340 |
| 8,533,910 | B2 * | 9/2013 | Bennett | A47H 15/04 16/87.8 |
| 8,756,760 | B2 * | 6/2014 | Ulbrich-Gasparevic | B64D 11/0023 16/93 D |
| 9,004,429 | B2 * | 4/2015 | Dennison | A47H 1/144 160/19 |
| 9,022,708 | B2 * | 5/2015 | Frey | B64D 11/0696 410/105 |
| 10,806,288 | B2 * | 10/2020 | Schöfer | A47H 1/04 |
| 11,125,518 | B1 * | 9/2021 | Liu | F42B 33/002 |
| 11,191,383 | B1 * | 12/2021 | Hatton | A47H 1/04 |
| 2006/0042673 | A1 * | 3/2006 | Tseng | E04H 15/32 135/117 |
| 2006/0225244 | A1 * | 10/2006 | Melinette | A47H 15/04 16/93 R |
| 2007/0277944 | A1 * | 12/2007 | Wu | A47H 13/01 160/330 |
| 2011/0204621 | A1 * | 8/2011 | Whitaker | A61M 39/1011 285/305 |
| 2012/0018106 | A1 * | 1/2012 | Robledo | A47H 1/04 160/330 |
| 2012/0043028 | A1 * | 2/2012 | Roach | B64D 11/0023 160/84.01 |
| 2016/0316952 | A1 * | 11/2016 | Wahl | A47H 1/04 |
| 2017/0002606 | A1 * | 1/2017 | Yu | A47H 13/04 |
| 2017/0172332 | A1 * | 6/2017 | Legault | A47H 15/02 |
| 2017/0231413 | A1 * | 8/2017 | Schöfer | A47H 13/02 160/330 |
| 2018/0020860 | A1 * | 1/2018 | Thomas | E06B 9/42 160/23.1 |
| 2018/0245389 | A1 * | 8/2018 | Andersson | A47H 15/04 |

* cited by examiner

QUICK LOADING CURTAIN TRACK FOR AN AIRCRAFT CABIN

FIELD

This disclosure is directed to a curtain track for an aircraft cabin that enables curtain sliders to be quickly loaded into the curtain track. More specifically, this disclosure is directed to a curtain track for an aircraft cabin comprised of an elongate channel, a first end fitting on a first end of the channel and a second end fitting on the second end of the channel. There is a unique cutout in a bottom surface of the first end fitting that enables curtain sliders to be loaded into the channel of the curtain track through the cutout to quickly load the curtain onto the curtain track without disassembling any of the parts of the curtain track or removing the curtain track from its attachment to the aircraft cabin.

BACKGROUND

There are many different types of curtain track assemblies for aircraft cabins. Many of the different types of curtain track assemblies are related in that they require the removal of an end cap from at least one end of the curtain track in order to install curtain sliders into the track and along the length of the track.

For example, there are curtain track assemblies for an aircraft cabin that require an end cap be unsnapped from an end of the curtain track and removed from the end of the curtain track. The curtain sliders are then able to be inserted into the open end of the track and slid along the track. Once the curtain sliders are loaded into the track, the end cap is returned to the end of the track and snapped into place to secure it.

In another type of curtain track assembly, a screw on the end cap is unscrewed to allow the end cap to be removed from the end of the track. Curtain sliders are then able to be inserted into the open end of the track and slid along the length of the track. Once the curtain sliders are loaded into the track, the end cap is returned to the end of the track and the screw of the end cap is screwed down to secure the end cap to the end of the track.

In a further curtain track assembly, an end cap on an end of the track is provided with a spring loaded or spring biased mechanism. The mechanism has a push pad that is manually pushed against a spring upward into the end cap until the push pad latches on a protrusion. The push pad pushed up to the latched position provides an opening in the end of the track for insertion of the curtain sliders through the opening and along the length of the curtain track. Once the curtain is loaded into the curtain track, the push pad is pushed upward into the end cap to unlatch the push pad and release it from the protrusion. The spring biasing the push pad then pushes the push pad downwardly into its original position in the end cap.

The first two described types of curtain tracks for an aircraft cabin require some disassembly of an end cap from the curtain track in order to load the curtain sliders into the curtain track. In some curtain track assemblies, the track and the attached end caps must first be disassembled from the structure of the aircraft cabin prior to the end cap being disassembled from the end of the track. Once the curtain sliders are installed in the track, the end cap must be reassembled to the end of the track. This is a very time consuming process for installing the curtain sliders into the curtain track. It is also a very time consuming process if maintenance of the curtain track assembly requires the curtain sliders to be removed from the curtain track. Again, the end cap must be removed from the end of the track, the curtain sliders removed from the track for maintenance, the curtain sliders then reinstalled in the track and the end cap reattached to the end of the track.

The aircraft curtain assembly that includes an end cap with a push pad is expensive to produce. The end cap comprised of the push pad, the biasing spring and the latching protrusion in the end cap is comparatively more expensive to produce than a conventional end cap.

SUMMARY

The quick loading curtain track for an aircraft cabin of this disclosure overcomes disadvantages associated with known curtain track assemblies by providing a curtain track that does not require any disassembly in order to load curtain sliders and a curtain into the curtain track, and does not require the curtain track be disassembled from a structure of an aircraft cabin in order to load curtain sliders and a curtain into the curtain track.

The curtain track is comprised of a channel, a first end fitting at a first end of the channel and a second end fitting at a second end of the channel. The curtain track suspends sliders for sliding movement of the sliders on the track. The track has a bottom surface that extends along a length of the track between a first end of the track and an opposite second end of the track.

There is a slot in the bottom surface of the track. The slot has a length extending along the length of the track between a first end of the slot and an opposite second end of the slot. The slot has a straight length between the first end of the slot and the second end of the slot. The slot separates a first ledge at the bottom of the track and a second ledge at the bottom of the track.

The first ledge has a top surface and an opposite bottom surface. The top surface of the first ledge and the bottom surface of the first ledge are parallel. A first slot surface extends between the bottom surface of the first ledge and the top surface of the first ledge adjacent the slot. The first slot surface and the bottom surface of the track or the bottom surface of the first ledge are oriented at a perpendicular angle. The first slot surface extends along the length of the slot and along the length of the track.

The second ledge has a top surface and an opposite bottom surface. The top surface of the second ledge and the bottom surface of the second ledge are parallel. A second slot surface extends between the bottom surface of the second ledge and the top surface of the second ledge adjacent the slot. The second slot surface and the bottom surface of the track or the bottom surface of the second ledge are oriented at a perpendicular angle. The second slot surface extends along the length of the slot and along the length of the track.

The first slot surface and the second slot surface are on opposite sides of the slot and are parallel.

A curved slot surface extends through the bottom surface of the track between the bottom surface of the first ledge and the top surface of the first ledge adjacent the slot. The curved slot surface is at the first end of the slot and is on the first end fitting. The curved slot surface is an extension of the first slot surface and is on an opposite side of the slot from the second slot surface. The curved slot surface and the bottom surface of the track or the bottom surface of the first ledge are oriented at an acute angle.

The second slot surface has an extension of the second slot surface that extends between the bottom surface of the second ledge and the top surface of the second ledge. The extension of the second slot surface is on the first end fitting and is on an opposite side of the slot from the curved slot surface. The extension of the second slot surface is a tapered slot surface that tapers away from the curved slot surface as the tapered slot surface extends from the second slot surface.

A plurality of sliders are positioned in the slot. Each slider has a head having a circular configuration with a perimeter dimension. Each slider also has a neck depending from the head, the neck having a cylindrical configuration with a perimeter dimension that is smaller than the perimeter dimension of the head. The neck of each slider is configured to engage against the curved slot surface of the end fitting as the head of each slider is passed through the slot between the curved slot surface and the second slot surface or between the curved slot surface and the tapered slot surface.

As stated earlier, the curtain track is comprised of a channel, a first end fitting at a first end of the channel and a second end fitting at a second end of the channel. An intermediate portion of the bottom surface of the track is defined by the bottom surface of the channel. The channel has a rectangular cross-section configuration. The channel has a length between the first end of the channel and the second end of the channel. The bottom surface of the channel extends between the first end of the channel and the second end of the channel. The slot extends through the bottom surface of the channel and defines the first ledge and the second ledge.

The first end fitting is attached on the first end of the channel. The first end fitting is attachable to a separate structure to attach the channel to the separate structure. The first end fitting has a bottom surface that defines a first end portion of the bottom surface of the curtain track. The curved slot surface extends through the bottom surface of the first end fitting and the tapered slot surface extends through the bottom surface of the first end fitting. The first end fitting telescopes on the first end of the channel, enabling adjustment of the length of the curtain track by telescoping the first end fitting on the first end of the channel.

The second end fitting is attached on the second end of the channel. The second end fitting is attachable to the separate structure to attach the channel to the separate structure. The second end fitting has a bottom surface that defines a second end portion of the bottom surface of the curtain track.

The features, functions, and advantages that have been discussed can be achieved independently in various embodiments or may be combined in yet other embodiments, further details of which can be seen with reference to the following description and drawings.

DETAILED DESCRIPTION

Figure 1:
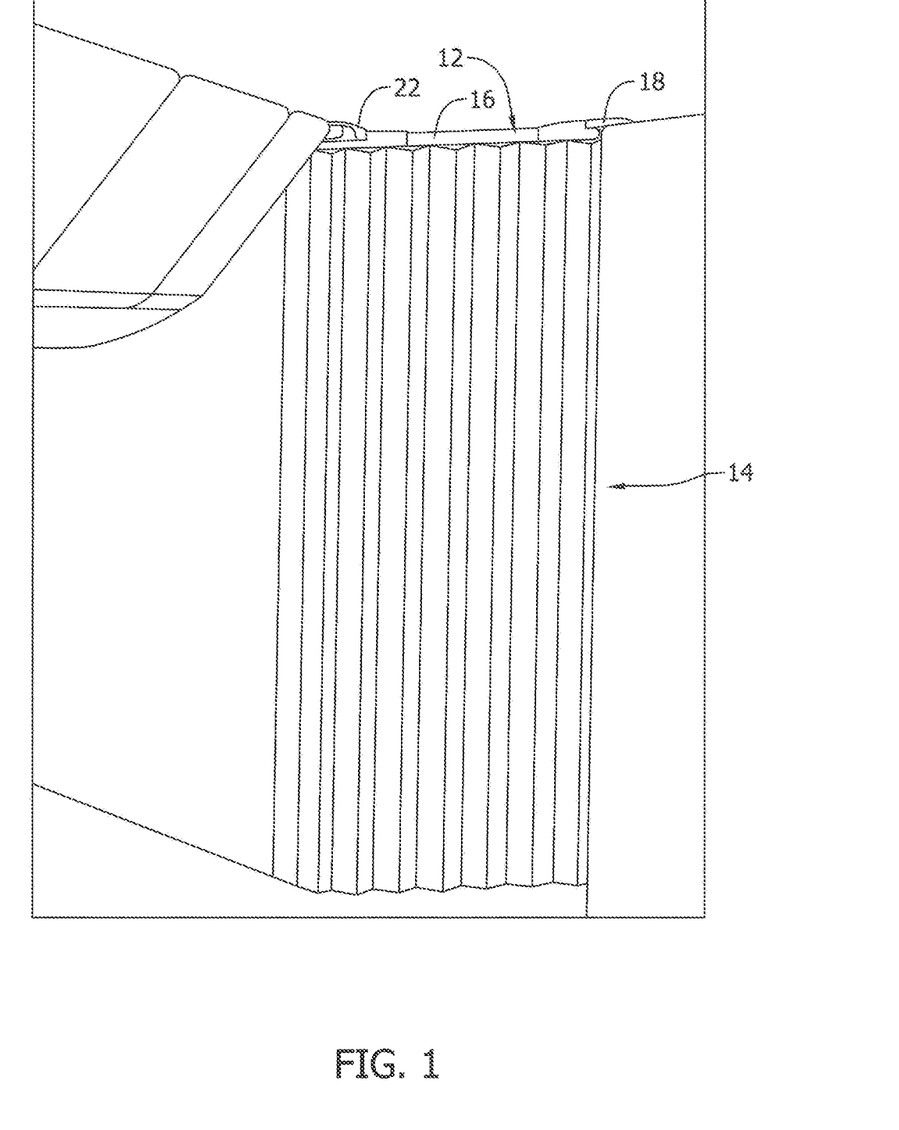
FIG. 1 is a representation of the quick loading curtain track for an aircraft cabin attached to a structure of an aircraft cabin and suspending a deployed curtain.
Figure 2:
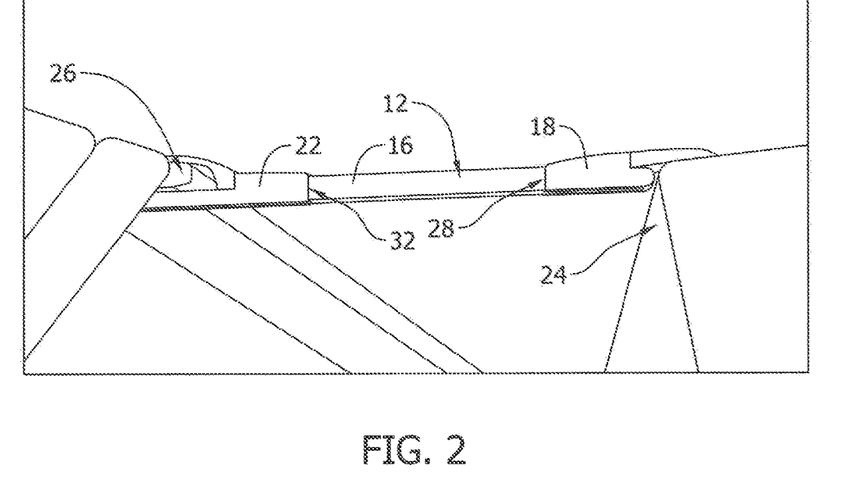
FIG. 2 is a representation of the quick loading curtain track attached to the structure of the aircraft with the curtain removed.

FIG. 1 is a representation of the quick loading curtain track 12 for an aircraft cabin. In FIG. 1 the curtain track 12 is represented in an aircraft cabin environment. However, it should be understood that the curtain track 12 of this disclosure can be used in other environments and is not limited to being used in an aircraft cabin. In FIG. 1, the curtain track 12 is shown suspending a curtain 14 by a plurality of curtain sliders (not shown) installed in the curtain track 12. The plurality of sliders (not shown) enable the curtain 14 to be moved across the curtain track 12 between a closed position as represented in FIG. 1, and an open position. The curtain track 12 is basically comprised of a channel 16 that extends along a majority of the length of the curtain track 12, a first end fitting 18 at one end of the channel 16 and a second end fitting 22 at the opposite end of the length of the channel 16. FIG. 2 is a representation of the curtain track 12 comprised of the channel 16, the first end fitting 18 and the second end fitting 22, with the curtain removed.

The first end fitting 18 and the second end fitting 22 are configured for attachment to stationary structures 24, 26 of the aircraft cabin to secure the curtain track 12 in the aircraft cabin. The first end fitting 18 is attached to a first end 28 of the channel 16 by being telescoped over the first end 28 of the channel 16. This enables the first end fitting 18 to be adjustably positioned on the first end 28 of the channel 16 by telescoping the first end fitting 18 over the first end 28 of the channel 16. The second end fitting 22 is also attached to a second end 32 of the channel 16 by being telescoped over the second end 32 of the channel 16. This enables the second end fitting 22 to be adjustably positioned on the second end 32 of the channel 16 by being telescoped over the second end 32 of the channel 16. The telescoping movement of the first end fitting 18 and the second end fitting 22 on the channel 16 enables the overall length of the curtain track 12 to be adjustable.

Figure 6:
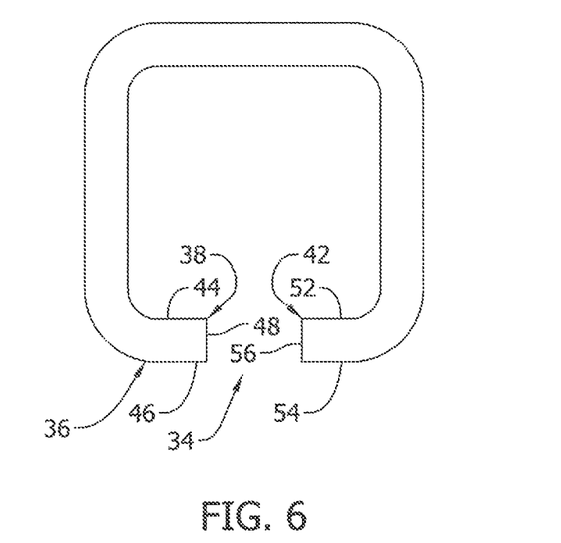
FIG. 6 is a representation of a cross-section of the curtain track in the plane of line 6-6 of FIG. 3.

The channel 16 has a rectangular cross-section configuration along its entire length between the first end 28 of the channel 16 and the second end 32 of the channel 16. The cross-section configuration of the channel 16 is represented in FIG. 6. The channel 16 is constructed of a lightweight material, for example aluminum or plastic. However, the channel 16 could be constructed of any other type of equivalent material that provides the channel 16 with sufficient strength to function as a part of the curtain track 12.

The channel 16 has a slot 34 through a bottom surface 36 of the channel 16. The slot 34 extends along the entire length of the channel 16 between the first end 28 of the channel 16 and the second end 32 of the channel 16. The slot 34 separates a first ledge 38 at the bottom of the channel 16 and a second ledge 42 at the bottom of the channel 16.

The first ledge 38 has a top surface 44 and an opposite bottom surface 46 that are parallel, flat surfaces. A first slot surface 48 extends between the top surface 44 of the first ledge 38 and the bottom surface 46 of the first ledge 38 adjacent the slot 34.

The second ledge 42 has a top surface 52 and an opposite bottom surface 54 that are parallel, flat surfaces. A second slot surface 56 extends between the top surface 52 of the second ledge 42 and a bottom surface 54 of the second ledge 42 adjacent the slot 34. The first slot surface 48 and the second slot surface 56 are on opposite sides of the slot 34, are parallel surfaces and extend along the entire length of the channel 16 between the first end 28 of the channel 16 and the second end 32 of the channel 16.

Figure 3:
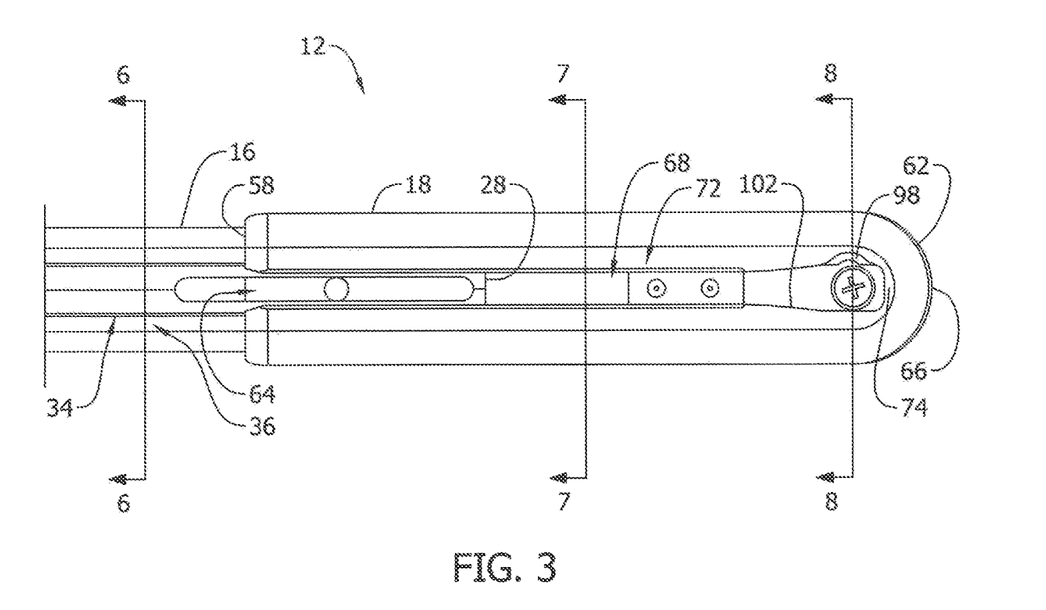
FIG. 3 is a representation of a partial, plan view of the curtain track at a first end of the curtain track.
Figure 7:
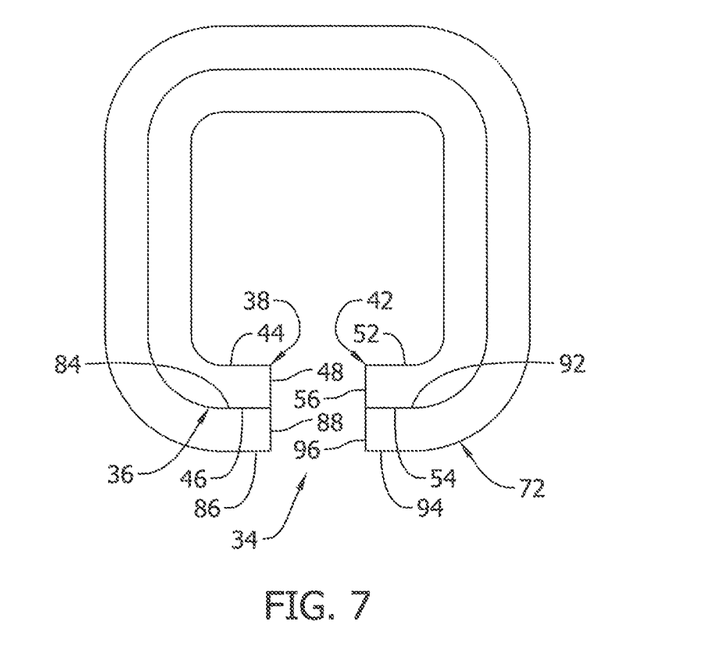
FIG. 7 is a representation of a cross-section of the curtain track in the plane of line 7-7 of FIG. 3.

The first end fitting 18 and the second end fitting 22 have substantially the same constructions, and therefore only the construction of the first end fitting 18 is described herein. FIG. 3 is a representation of an enlarged, partial, plan view of the first end fitting 18 telescoped on the first end 28 of the channel 16 of the curtain track 12. The first end fitting 18 like the channel 16, has a general rectangular cross-section configuration. The first end fitting 18 is constructed of a lightweight material, for example aluminum or plastic. However, the first end fitting 18 could be constructed of other equivalent materials that provide the first end fitting 18 with sufficient strength to function as a part of the curtain track 12. The first end fitting 18 has a length that extends between a proximal end 58 of the first end fitting 18 and an opposite distal end 62 of the first end fitting 18. The first end fitting 18 has a hollow interior and an opening 64 at the proximal end 58 of the first end fitting 18 that provides access to the hollow interior. The opening 64 at the proximal end 58 of the first end fitting 18 is dimensioned to enable the proximal end 58 of the first end fitting 18 to receive the first end 28 of the channel 16 in the opening and into the interior volume of the first end fitting 18 with the first end fitting 18 telescoping over the first end 28 of the channel 16. The first end fitting 18 has an end wall 66 at the distal end 62 of the first end fitting 18. The end wall 66 closes over the hollow interior volume of the first end fitting 18. The first end fitting 18 has a slot 68 through a bottom surface 72 of the first end fitting 18. The slot 68 extends through the opening 64 at the proximal end 58 of the first end fitting 18 and extends along the bottom surface 72 of the first end fitting 18 to an end surface 74 of the slot 68 adjacent the distal end 62 of the first end fitting 18. The first end fitting 18 has a rectangular cross-section configuration along its entire length between the proximal end 58 of the first end fitting 18 and the distal end 62 of the first end fitting 18. The cross-section configuration of the first end fitting 18 is slightly larger than the cross-section configuration of the channel 16, enabling the first end fitting 18 and the second end fitting 22 to be telescoped over and engaged in a sliding friction engagement on the respective first end 28 of the channel 16 and second end 32 of the channel 16. The cross-section configuration of the first end fitting 18 in a plane of the line 7-7 of FIG. 3 is represented in FIG. 7.

The slot 68 in the bottom surface 72 of the first end fitting 18 extends along the first end fitting 18 from the proximal end 58 of the first end fitting 18 to the slot end surface 74. The slot 68 separates a first ledge 78 at the bottom of the first end fitting 18 and a second ledge 82 at the bottom of the first end fitting 18. The first ledge 78 of the first end fitting 18 functions as an extension of the first ledge 38 of the channel 16 and the second ledge 82 of the first end fitting 18 functions as an extension of the second ledge 42 of the channel 16. The first ledge 78 has a top surface 84 and an opposite bottom surface 86 that are parallel, flat surfaces. A first slot surface 88 extends between the top surface 84 of the first ledge 78 and the bottom surface 86 of the first ledge 78 adjacent the slot 68 in the first end fitting 18.

The second ledge 82 of the first end fitting 18 has a top surface 92 and an opposite bottom surface 94 that are parallel, flat surfaces. A second slot surface 96 extends between the top surface 92 of the second ledge 82 and the bottom surface 94 of the second ledge 82 adjacent the slot 68. As represented in FIG. 7, the first slot surface 88 and the second slot surface 96 are on opposite sides of the slot 68, are parallel surfaces and extend along the length of the first end fitting 18 from the proximal end 58 of the first end fitting 18 toward the distal end 62 of the first end fitting 18, but stop just short of the slot end surface 74.

Figure 8:
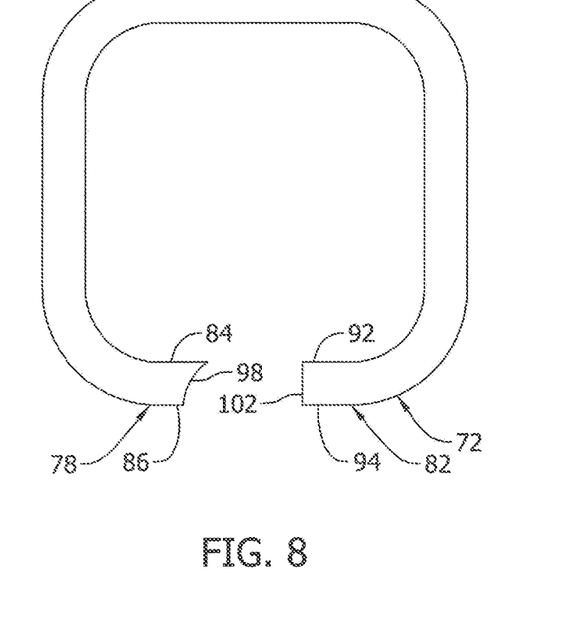
FIG. 8 is a representation of a cross-section of the curtain track in the plane of line 8-8 of FIG. 3.

As the first slot surface 88 of the first end fitting 18 approaches the slot end surface 74, the first slot surface 88 merges into a curved slot surface 98 represented in FIGS. 3 and 8. The curved slot surface 98 extends between the first ledge bottom surface 86 and the first ledge top surface 84 of the first end fitting 18. At the first ledge bottom surface 86 the curved surface 98 has a larger curvature than the curvature of the curved slot surface 98 at the first ledge top surface 84, as represented in FIG. 3. As represented in FIG. 8, the curved slot surface 98 is oriented at an acute angle with the first ledge top surface 84 and is oriented at an obtuse angle with the first ledge bottom surface 86 of the first end fitting 18. The curved slot surface 96 is an extension of the first slot surface 88 and extends to the slot end surface 74.

The second slot surface 96 has an extension 102 of the second slot surface 96 that extends between the top surface 92 of the second ledge 82 and the bottom surface 94 of the second ledge 82. The extension 102 of the second slot surface 96 is on an opposite side of the slot 68 from the curved slot surface 98. The extension 102 of the second slot surface 96 is a tapered slot surface that tapers away from the curved slot surface 98 as the tapered second slot surface extension 102 extends from the second slot surface 96 to the slot end surface 74. The extension 102 of the second slot surface 96 is perpendicular to the top surface 92 and the bottom surface 94 of the second ledge 82 of the first end fitting 18.

Figure 4:
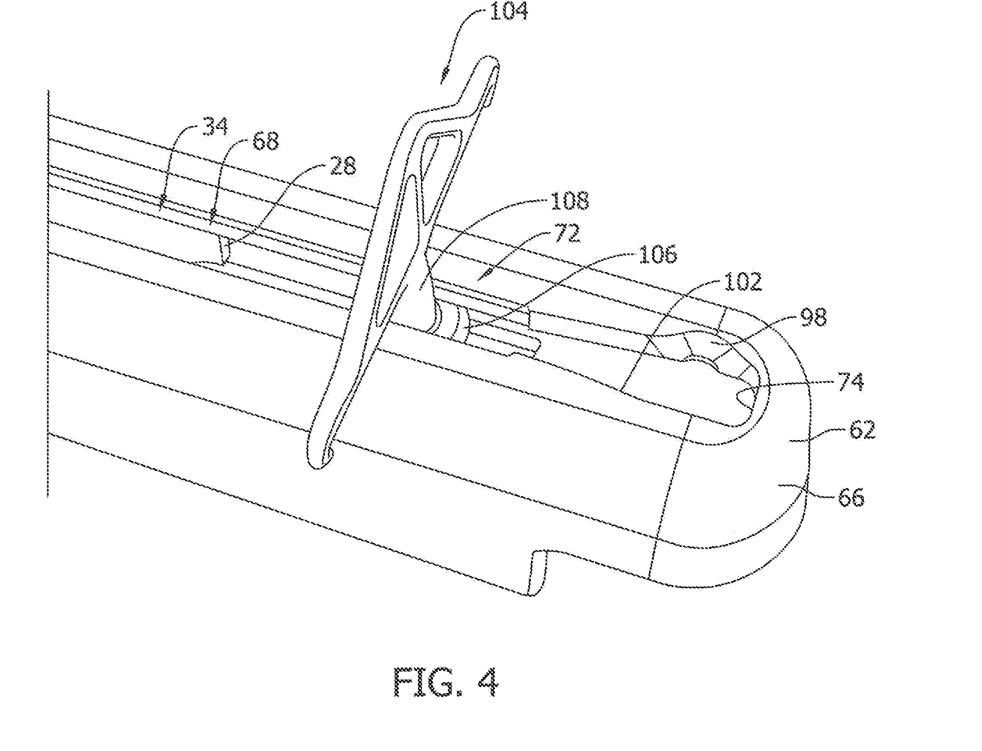
FIG. 4 is a representation of a perspective view of the first end of the curtain track represented in FIG. 3.
Figure 5:
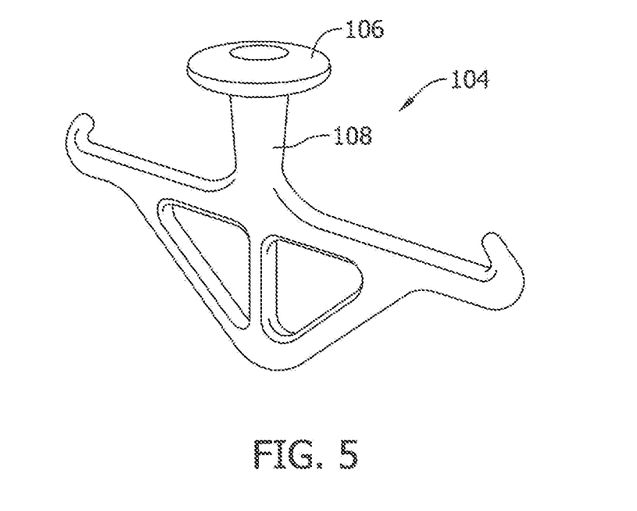
FIG. 5 is a representation of a perspective view of a curtain slider.
Figure 9:
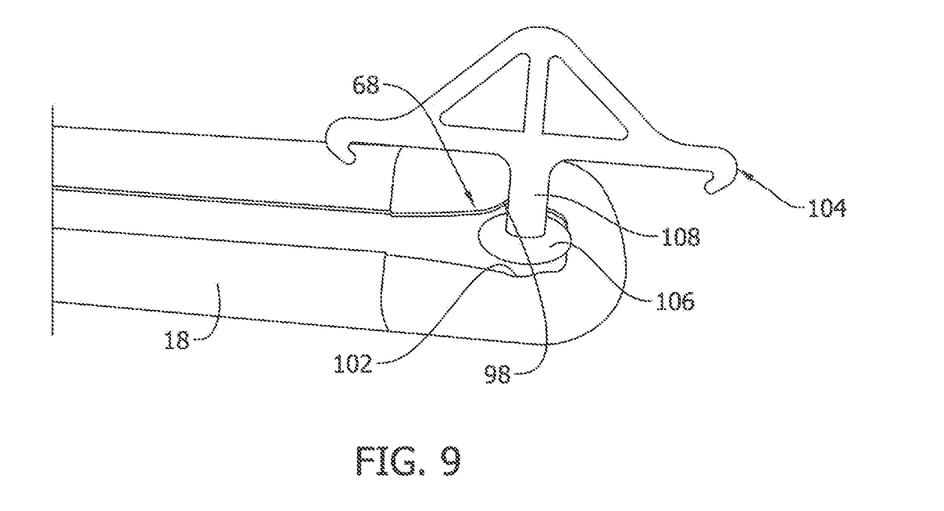
FIG. 9 is a representation of a plan view of the method of inserting a curtain slider into the slot of the curtain track at the first end of the curtain track.

The curved slot surface 98 and the extension 102 of the second slot surface 96 provide an enlarged area of the slot 68 adjacent the slot end surface 74. This enlarged area of the slot 68 enables a slider 104 to be inserted through the enlarged area and into the slot 68. A construction of a slider 104 is represented in FIG. 5. The slider 104 has a head 106 having a circular configuration with a perimeter dimension and a diameter dimension. The diameter dimension of the head 106 is larger than the width dimension of the slot 68 of the first end fitting 18, larger than the width dimension of the slot 34 of the channel 16 and larger than the width dimension of the slot of the second end fitting 22. The slider 104 also has a neck 108 that extends from the head 106. The neck 108 has a cylindrical configuration with a perimeter dimension that is smaller than the perimeter dimension of the head 106, and a diameter dimension that is smaller than the width dimension of the slot 68 in the first end fitting 18, the width dimension of the slot 34 in the channel 16 and the width dimension of the slot in the second end fitting 22. As represented in FIG. 9, the neck 108 of the slider 104 is configured to engage against the curved slot surface 98 as the head 106 of the slider 104 is passed through the slot 68 between the curved slot surface 98 and the surface extension 102 of the second slot surface 96. This positions the head 106 inside the first end fitting 18 where the head 106 can be manually moved through the slot 68 in the first end fitting 18 and into the slot 34 of the channel 16. In this manner, the curved slot surface 98 and the surface extension 102 of the second slot surface 96 enable sliders 104 such as the slider 104 represented in FIGS. 4 and 9 to be inserted into and slide through the slot defined by the slot 68 in the first end fitting 18, the slot 34 inside the channel 16 and the slot inside the second end fitting 22 without disassembling the curtain track 12 and without removing the curtain track 12 from the first stationary structure 24 and the second stationary structure 26.

Although the slot 34 of the channel 16 is described as being a straight slot, the slot 34 and the channel 16 could also have curved configurations.

Additionally, although the first end fitting 18 and the second end fitting 22 have been described as having substantially the same constructions, it is not necessary that the second end fitting 22 also have a curved slot surface and an opposite tapered slot extension surface as does the first end fitting 18.

As various modifications could be made in the construction of the quick loading curtain track and its method of use herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A track that suspends at least one slider and provides sliding movement of the at least one slider on the track, the track comprising:
   a bottom surface of the track extending along a length of the track, and the bottom surface of the track defines a slot having a length extending along the length of the track;
   a first end fitting having a first slot surface extending through the bottom surface of the track adjacent the slot, the first slot surface extending along the length of the track, wherein the first end fitting has a second slot surface extending through the bottom surface of the track adjacent the slot, the second slot surface extending along the length of the track;
   wherein the first slot surface and the second slot surface are disposed on opposite sides of the slot;
   wherein the first end fitting has a curved slot surface extending through the bottom surface of the track adjacent the slot, the curved slot surface is an extension of the first slot surface and is on an opposite side of the slot from of the second slot surface;
   a channel having a length between a first end of the channel and a second end of the channel, the channel having a bottom surface that extends between the first end of the channel and the second end of the channel;
   wherein the first end fitting is disposed on the first end of the channel, the first end fitting is attachable to a separate structure to attach the channel to the separate structure; and,
   wherein the first end fitting is configured to telescope on the first end of the channel to adjust the length of the track.

2. The track of claim 1, wherein:
the second slot surface has an extension;
the extension of the second slot surface is on an opposite side of the slot from the curved slot surface; and,
the extension of the second slot surface is a tapered slot surface that tapers away from the curved slot surface as the tapered slot surface extends from the second slot surface.

3. The track of claim 1, wherein:
the slot has a first end and a second end at opposite ends of the length of the track; and,
the curved slot surface is at the first end of the slot.

4. The track of claim 1, wherein:
the first slot surface of the first end fitting merge into the curved slot surface proximal to a slot end surface of the slot such that the curved slot surface is open to the slot.

5. The track of claim 1, wherein:
the slider has a head, and the head has a perimeter dimension;
the slider has a neck depending from the head, and the neck has a perimeter dimension that is smaller than the perimeter dimension of the head; and,
the neck of the slider is configured to engage against the curved slot surface as the head of the slider passes through the slot between the curved slot surface and the second slot surface.

6. The track of claim 5, wherein:
the slider is one of a plurality of sliders, and each slider of the plurality of sliders has a head, and the head has a perimeter dimension;
each slider of the plurality of sliders has a neck depending from the head of the respective slider, and the neck of each slider has a perimeter dimension that is smaller than the perimeter dimension of the head of the respective slider; and,
the neck of each slider is configured to engage against the curved slot surface as the head of each slider passes through the slot between the curved slot surface and the second slot surface.

7. The track of claim 1:
wherein the channel has a rectangular cross-section configuration, the bottom surface of the channel defines an intermediate portion of the bottom surface of the track;
further comprising a second end fitting disposed on the second end of the channel, the second end fitting is attachable to the separate structure to attach the channel to the separate structure; and,
wherein the second end fitting is configured to telescope on the second end of the channel to adjust the length of the track.

8. The track of claim 7, wherein:
the first end fitting has a bottom surface that defines a first end portion of the bottom surface of the track; and,
the curved slot surface extends through the bottom surface of the first end fitting.

9. The track of claim 1, wherein:
the curved slot surface and the bottom surface of the track are oriented at an acute angle; and,
the second slot surface and the bottom surface of the track are oriented at a perpendicular angle.

10. A track that suspends at least one slider and provides sliding movement of the at least one slider on the track, the track comprising:
a bottom surface of the track extending along a length of the track, the bottom surface of the track defines a slot having a length extending along the length of the track, the slot separating a first ledge at the bottom surface of the track and a second ledge at the bottom surface of the track;

wherein the first ledge has a top surface and an opposite bottom surface, the top surface of the first ledge and the bottom surface of the first ledge are spaced from each other;

wherein the second ledge has a top surface and an opposite bottom surface, the top surface of the second ledge and the bottom surface of the second ledge are spaced from each other;

a first end fitting having a first slot surface extending between the bottom surface of the first ledge and the top surface of the first ledge adjacent the slot, the first slot surface extending along the length of the track, wherein the first end fitting has a second slot surface extending between the bottom surface of the second ledge and the top surface of the second ledge adjacent the slot, the second slot surface extending along the length of the track;

wherein the first slot surface and the second slot surface are disposed on opposite sides of the slot;

wherein the first end fitting has a curved slot surface extending between the bottom surface of the first ledge and the top surface of the first ledge adjacent the slot, the curved slot surface is an extension of the first slot surface and is on an opposite side of the slot from the second slot surface;

a channel having a length between a first end of the channel and a second end of the channel;

wherein the first end fitting is disposed on the first end of the channel, the first end fitting is attachable to a separate structure to attach the channel to the separate structure; and, wherein the first slot surface of the first end fitting merge into the curved slot surface proximal to a slot end surface of the slot such that the curved slot surface is open to the slot.

11. The track of claim 10, wherein:
the second slot surface has an extension extending between the bottom surface of the second ledge and the top surface of the second ledge;
the extension of the second slot surface is on an opposite side of the slot from the curved slot surface; and,
the extension of the second slot surface is a tapered slot surface that tapers away from the curved slot surface as the tapered slot surface extends from the second slot surface.

12. The track of claim 10, wherein:
the slot has a first end and a second end at opposite ends of the length of the slot and at opposite ends of the length of the track; and,
the curved slot surface is at the first end of the slot.

13. The track of claim 12, wherein:
the slot has a straight length between the first end of the slot and the second end of the slot.

14. The track of claim 10, wherein:
the slider has a head, and the head has a circular configuration with a perimeter dimension;
the slider has a neck depending from the head, the neck having a cylindrical configuration with a perimeter dimension that is smaller than the perimeter dimension of the head; and,
the neck of the slider is configured to engage against the curved slot surface as the head of the slider passes through the slot between the curved slot surface and the second slot surface.

15. The track of claim 14, wherein:
the slider is one of a plurality of sliders, and each slider of the plurality of sliders has a head, the head of each slider of the plurality of sliders has a perimeter dimension;
each slider of the plurality of sliders has a neck depending from the head of the respective slider, the neck of each slider has a perimeter dimension that is smaller than the perimeter dimension of the head of the respective slider; and,
the neck of each slider is configured to engage against the curved slot surface as the head of each slider passes through the slot between the curved slot surface and the second slot surface.

16. The track of claim 10:
wherein the channel has a rectangular cross-section configuration, the channel having a bottom surface that extends between the first end of the channel and the second end of the channel, the bottom surface of the channel defines an intermediate portion of the bottom surface of the track;
further comprising a second end fitting disposed on the second end of the channel, the second end fitting is attachable to the separate structure to attach the channel to the separate structure;
wherein the first end fitting is configured to telescope on the first end of the channel to adjust the length of the track; and,
wherein the second end fitting is configured to telescope on the second end of the channel to adjust the length of the track.

17. The track of claim 16, wherein:
the first end fitting has a bottom surface that defines a first end portion of the bottom surface of the track;
the second end fitting has a bottom surface that defines a second end portion of the bottom surface of the track; and,
the curved slot surface extends through the bottom surface of the first end fitting.

18. The track of claim 10, wherein:
the first slot surface is oriented at an acute angle between the first slot surface and the bottom surface of the first ledge; and,
the second slot surface has a perpendicular orientation between the second slot surface and the bottom surface of the second ledge.

19. A method of suspending a plurality of sliders for sliding movement of the sliders along a length of a track, wherein a bottom surface of the track extends along the length of the track, and the bottom surface of the track defines a slot having a length extending along the length of the track, the method comprising:
telescoping a first end fitting on a first end of a channel to adjust the length of the track, wherein the first end fitting is disposed on the first end of the channel and the first end fitting has a first slot surface extending through the bottom surface of the track adjacent the slot, the first slot surface extending along the length of the track, wherein the first end fitting has a second slot surface extending through the bottom surface of the track adjacent the slot, the second slot surface extending along the length of the track, wherein the first slot surface and the second slot surface are disposed on opposite sides of the slot, wherein the first end fitting has a curved slot surface extending through the bottom surface of the track adjacent the slot, the curved slot surface is an extension of the first slot surface and is on an opposite side of the slot from of the second slot surface;

attaching the first end fitting to a separate structure to attach the channel to the separate structure, wherein the channel has a length between the first end of the channel and a second end of the channel, the channel having a bottom surface that extends between the first end of the channel and the second end of the channel; and, passing a head of each of the sliders through the slot in the bottom surface of the track by engaging a neck of each of the sliders against a curved slot surface extending through the bottom surface of the track adjacent the slot while passing the head of each of the sliders through the slot, wherein the neck of each of the sliders depend from the head of the respective sliders.

20. The method of claim 19, wherein:

engaging the neck of each of the sliders against the curved slot surface of the track further comprises engaging the neck of each of the sliders against the curved slot surface while the head of each of the sliders are passed through the slot between the curved slot surface and a tapered slot surface on an opposite side of the slot from the curved slot surface with the tapered slot surface tapering away from the curved slot surface.

* * * * *